United States Patent [19]

Fuhrmann

[11] 4,092,753
[45] June 6, 1978

[54] COMBINATION DRILL AND SCREWDRIVER

[76] Inventor: Manfred E. Fuhrmann, 115 West St., Mamaroneck, N.Y. 10543

[21] Appl. No.: 673,990

[22] Filed: Apr. 5, 1976

[51] Int. Cl.² ............................................... B25F 3/00
[52] U.S. Cl. ........................................... 7/158; 7/165
[58] Field of Search ................. 7/14.1 R, 1 R, 1 G; 145/50 B, 50 C

[56] References Cited

U.S. PATENT DOCUMENTS

| | | | |
|---|---|---|---|
| 3,336,611 | 8/1967 | Schepp | 7/14.1 R |
| 3,484,114 | 12/1969 | Rodin | 7/14.1 R X |
| 3,932,904 | 1/1976 | Nilsson | 7/14.1 R |
| 3,965,510 | 6/1976 | Ernst | 7/14.1 R |

Primary Examiner—Al Lawrence Smith
Assistant Examiner—Roscoe V. Parker
Attorney, Agent, or Firm—Martin J. Spellman, Jr.

[57] ABSTRACT

A combination screwdriver and drill attachment for a power tool including in one embodiment a bit having the distal end formed as a Phillips-head screwdriver for use not only as a screwdriver but for use in boring pilot holes for screws as well as performing counterboring and countersinking operations. In a second embodiment the combination screwdriver and drill attachment includes a screwdriver provided with a longitudinal passage through which a drill bit retractably passes.

2 Claims, 9 Drawing Figures

COMBINATION DRILL AND SCREWDRIVER

BACKGROUND OF THE INVENTION

1. Field of the Invention

The present invention is concerned with ways of increasing the efficiency of fastening materials together with screw fasteners and is especially concerned with increasing the efficiency and convenience of accomplishing the fastening in areas where close tolerances are required, such as in cabinetmaking. A further object of the invention is to eliminate many separate tool-handling steps in such fastening operations which previously required a separate tool for drilling, counterboring, countersinking and for securing the screw fastener in place. Other areas in which the present invention is useful are in situations where the user is required to fasten things with screw means from a ladder, scaffold or the like where there is no convenient rest for power tools such as drills, screw drivers and the like. The present invention provides a combination tool which eliminates many of the handling steps previously required in such operations. The present invention also incorporates built-in guides for controlling the depth of bores, countersinks and counterbores.

2. Prior Art

There are no known references suggesting or closely related to the combination tools disclosed and claimed herein. A few attempts in the past have been made to combine drilling and screwdriving operations but they have not been perfected to any extent.

In U.S. Pat. No. 3,869,741 Logan, there is disclosed a screwdriver bit for a Phillips-head screwdriver which has a threaded portion behind the screw engaging end of the screwdriver which serves to ream out pre-drilled holes such as in painted sheet metal wherein the paint may have clogged the prepunched holes which require unclogging due to the presence of paint.

U.S. Pat. No. 3,207,196 Stillwagon, Jr. discloses a countersinking tool which is in the form of a screwdriver bit for a Phillips-head type of screwdriver extend outwardly in two tapering steps in order to provide countersinking and counterboring effect due to a wearing or rubbing through the abrasion of the tool by its wings upon soft wall board or like material. This tool is not a cutting tool but merely a brading tool and does not suggest any way to actually cut or bore the hole or to cut out a countersink. Furthermore, there is no positive control on the depth of the countersink or counterbore which might be formed by the tool. Hence, it is totally unsuitable for precision operations.

The present invention provides a combination tool for use in screw fastening of materials together wherein convenience, efficiency and precision are of great importance, for example, in such areas as kitchen cabinetmaking. The tool of the present invention combines in one tool a screwdriver and drill not only for boring pilot holes for screws but providing counterboring and countersinking operations.

This is accomplished through two general embodiments of the invention.

In the first embodiment, the screwdriver-drill bit combination incorporating the present invention is adapted to be secured to the distal end of any standard drill by way of magnetic fastening, set screws, chucks or the like. The distal end of the bit in this first embodiment of the invention is shaped in the form of a Phillips-head screwdriver or the like with wings at right angles to each other with flutes or valleys in between. At the distal end, the wings are tapered upwardly in the form of the usual Phillips-head type of screwdriver or the like. Behind this taper, the wings thereafter are parallel to the longitudinal axis of the bit for a distance which is determined by the desired width and depth to be utilized in the bit. Optionally, they can blend in with the cylindrical shaft of the bit. In various modifications of the type of bit, the wings can taper outwardly further following the above boring section to form a countersinking cut at the angle desired and then become parallel to the longitudinal axis or merge into outer cylindrical surface of the bit. The proximal end of the bit is provided with a suitable fastening means to the tool drive and in most cases, as in a cabinetmaking type of tool, a standard magnetic holding means is employed.

In the preferred form of this embodiment, the shaft of the tool at the upper portion thereof is provided with a series of annular grooves to provide securing means for an annular collar from the lower portion of which collar is a depending skirt. The skirt serves to control the depth of the countersink, and the skirt is provided with transverse openings through which shavings can be dispersed.

There are various modifications in the shape and slope of the wings that may be utilized within the scope of the present invention. The wings involved are provided with hardened and sharpened edges to cut on the outer edge of the face of the wing on the side in the direction of the normal rotation of the drill. This, for most operations, is more than adequate cutting means.

In a further embodiment of the invention, the bit for the screwdriver is provided with a longitudinal central passage therein through which a drill bit retractably passes. A drill bit of a suitable length is secured to the driving source of the tool. A cylindrical shaft having a hollow central portion through which the bit passes in close but non-engaging tolerance is passed over the bit and secured to the bit so that they rotate together when the shaft is driven. It is secured by means of a normal set screw which is tightened against the drill bit.

The outer shaft is provided with diametrically opposed pins extending from its sides which serve to lock the shaft into longitudinally sliding engagement with an outer cylindrical shell casing normally riding longitudinally in corresponding longitudinal grooves in the internal surfaces of the outer shell casing. In one modification, however, the pins on the shaft are secured in diametrical slots in the walls of said casing at the distal end of the casing relative to the operative end of the tool. An internal central passage of the outer shell casing is provided with an annular shoulder at the upper portion thereof in order to retain a coil spring which is located about the shaft and between the shoulder and a ring lock adjacent the base of the shaft.

Between this ring and the lower portion of the shaft is another coil spring of somewhat greater tension than the upper spring which surrounds the drill bit and extends to the distal end of the lower portion of the shaft. Adjacent the lower end of the outer shell, the drill bit passes through a cylindrical guide block having a central passage therethrough which guide block is locked in place by retaining springs set into circumferential grooves in the lower portion of the outer shell. The cross section of the outer shell in its lowermost regions is non-circular so that the screwdriver bit may be locked in place relative to rotation of the outer shell.

In operation, the downward pressure by the operator forces the end of the drill bit through the central opening of the screwdriver bit to perform normal drilling operations and the screwdriver bit merely serves as a guide for locating the bit. When it is desired to utilize the screwdriver function, the outer shell is pulled down and turned one-quarter turn to lock the diametrical pins of the inner shaft into slots in the upper portion of the outer shell casing, which in turn prevents the sliding longitudinal movement of the device's drill bit relative to the outer shell and screwdriver bit.

BRIEF DESCRIPTION OF THE DRAWINGS

In the accompanying drawing which forms a part of the specification.

BRIEF DESCRIPTION OF SPECIFIC EMBODIMENTS

Figure 1:
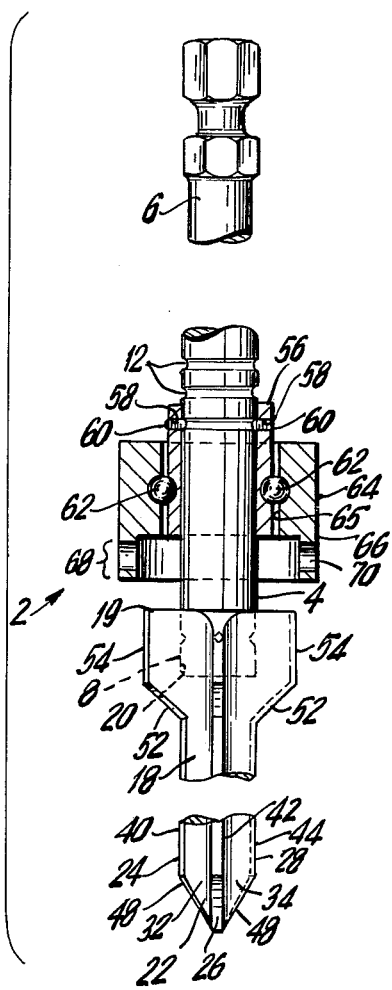
FIG. 1 is a plan view partly in section showing one embodiment of the screwdriver drill of the present invention.
Figure 2:
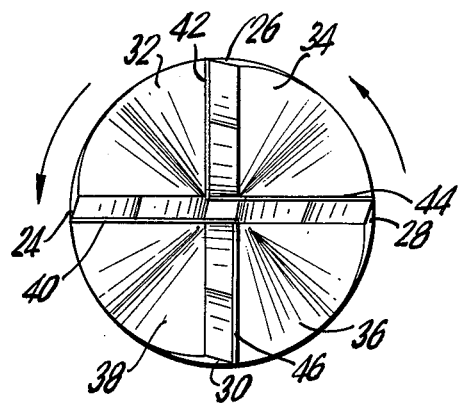
FIG. 2 is a partial end view taken from below the drill of FIG. 1.

Referring to FIG. 1 of the accompanying drawing, there is illustrated one embodiment of the combination drill and screwdriver according to this invention. The combination tool is indicated generally at 2 and comprises a central shaft 4 which is adaptable at its proximal end 6 to be attached to a source of rotary motion such as a common quarter inch electric drill and a lower or distal end 8 which may be magnetized in a known manner to secure the bit described below when it is fit into the recess 20 at the proximal end of the bit 18. The upper portion of the shaft may be provided with a series of annular grooves indicated generally at 12 which serve to hold the collar 56 in place in the manner described below. The distal end 8 of the shaft 4 is also provided with slots or pins to yieldingly fit into corresponding slots or pins in the recess 20 in the proximal end 19 of the bit 18. The bit 18 as shown in FIGS. 1 and 2 is provided with four wings 24, 26, 28 and 30 oriented longitudinally to the axis of the bit and at right angles to each other in the generally known manner of a Phillips-head type of screwdriver. Valleys 32, 34, 36 and 38 are formed in the area defined between the sides of the corresponding wings. At the lowermost portion of the distal end 22 of the bit 18, the wings 24, 26, 28 and 30 are tapered as shown at 48. The wings are, in the embodiment shown, tapered further out as shown at 52 at an angle corresponding to a suitable selected screw countersink portion and then extend longitudinally as shown at 54 for a distance upwards to the proximal end 19 of the bit 18 sufficient to correspond to the depth of most desired counterbores. Each of the wings 24, 26, 28 and 30 is bevelled by precision grinding along its longitudinal edges and at a slight bevel angle so that a sharp cutting edge 40, 42, 44 and 46 is formed at the intersection of the outer surfaces of the wings and the side walls of the wings. As indicated, the upper portion 6 of the shaft 8 has fitted around it an annular collar 56 comprised of an outer portion 64 and an inner portion 65. The inner portion 65 of the collar 56 extends upwardly as shown and is provided with one or more threaded bores 58 to receive set screws 60 which can engage rings 12 for locking the collar assembly 56 longitudinally in relation to the shaft 4. A conventional bearing 62 is interspersed between the inner collar 65 and outer collar 64 so that they may rotate independently of each other. The outer collar extends radially a distance greater than the radius of any suitable bit 18 which may be employed. The outer collar 64 on its lower edge is provided with a depending annular ring 66 having a height 68 designed to control the maximum depth of drilling depending upon which ring 66 the collar 64 is secured to. The depending annular ring 66 is provided with one or more exhaust holes 70 extending therethrough so that when the lower edges of the depending edge 66 come in contact with a surface being drilled, the shavings may escape.

Figure 3:
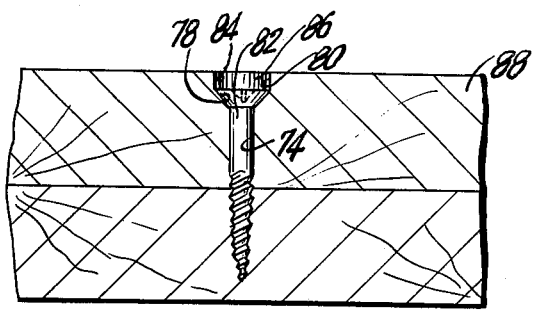
FIG. 3 is a cross-sectional view of a fastener in place after being secured utilizing the tool of the present invention.

Referring to FIG. 3, there is shown in cross section a screw 82 which has been inserted in a wood base 88 which has been prepared by drilling, countersinking and counterboring utilizing the combination drill screwdriver of the present invention. The drill portion of the bit 18 bores the hole 74 into the wood base 88 at a depth corresponding to the depth that it is desired to sink the screw and then the wings at the countersinking portion 52 of the bit 18 cut the shape of the slope 78 and the edges of the wings at 54 drill the counterbore 80. The Phillips-head type screw 82 is then put in place utilizing the proximal end of bit 18 with the wings in the tapered portion 48. The recess 84 formed by the counterboring is then filled in with a plug 86 of suitable material in the manner shown.

Figure 4:
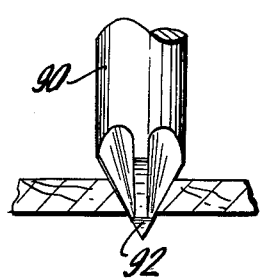
FIG. 4 is a partial plan view of the alternative embodiment of the combination screwdriver bit.
Figure 5:
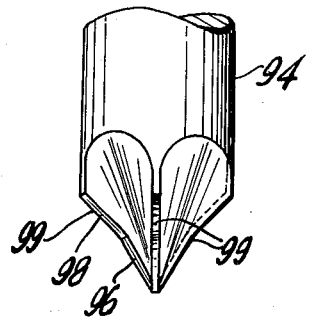
FIG. 5 is a further modification of the bit utilized in the embodiment of FIG. 1.

Additional shapes for the boring wings of the combination drill are shown in FIGS. 4 and 5. In FIG. 4, only the lower portion 92 of the edge of the wings on bit 90 is sharpened in order to provide a cut hole to start and guide screws in substrates. This is significant and eliminates the necessity for utilizing self-tapping screws which are extremely expensive.

In FIG. 5, there is shown bit 94 wherein the sahpe of the wings at the lower portion is angled out to tapers 96 and 98 so that the drilling and countersinking operations are combined. The sharpened bevelled edges of the wings are shown at 99.

Figure 6:
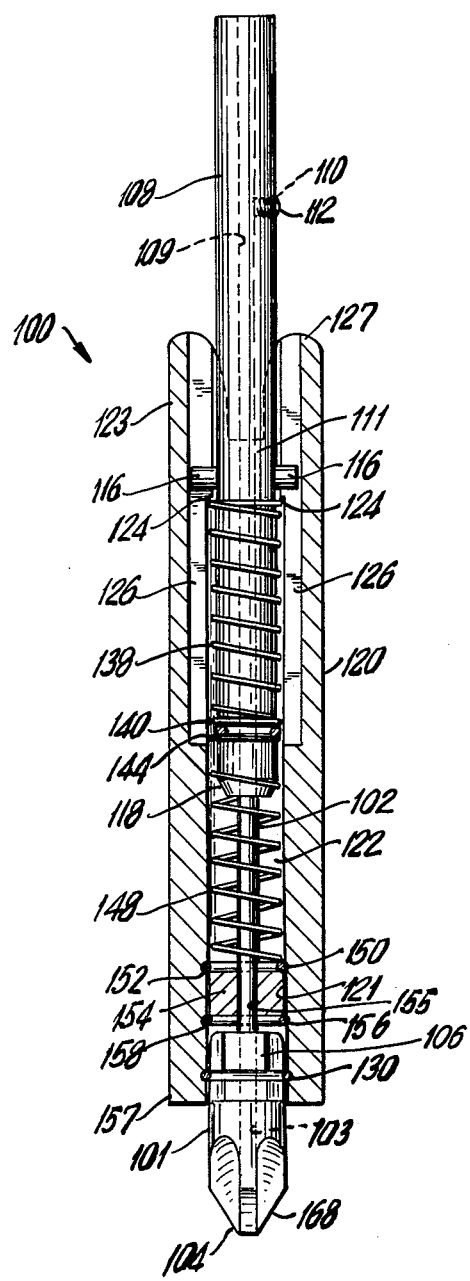
FIG. 6 is a sectional view of an alternative embodiment of the drill screwdriver combination of the present invention in which the drill bit passes through a central aperture in the screwdriver portion.

Referring now to FIG. 6, an alternate embodiment of the invention is shown generally at 100. In this case, a Phillips-head type of screwdriver bit 101 having central longitudinal passage 103 is located at the lower end of the tool 100 and has a cutting drill bit 102 passing through the central longitudinal passage 103 in the screwdriver bit 101. The cutting drill bit 102 has a distal end 104 and a proximal end 106. The upper portions of the cutting drill bit 102 are surrounded with a hollow cylindrical annular shaft 108 having a central longitudinal passage 109 therethrough. The upper portion of the annular shaft 108 has one or more transverse threaded bores 110 in which a threaded set screw 112 may be inserted and tightened to lock the annular outer shaft 108 into engagement with the bit 102. The central portion 111 of the hollow shaft 108 is provided with two diametrically opposed lateral pins 116 extending outwardly from the surface of the shaft 108 into sliding engagement with the longitudinal slots 126 formed in the outer sleeve 120. The hollow shaft 108 terminates in the central area of the outer sleeve 120 as indicated at 118.

The outer sleeve 120 generally has an annular longitudinal passage running through the center thereof indicated by 122, the passage 122 being of lesser diameter at the upper end 123 of the sleeve 120 than the lower. An annular shoulder 124 is formed where the small and larger diameters of the shaft meet.

As indicated, the outer sleeve 120 is provided in its upper half with opposed longitudinal slots 126 of such depth to slidingly receive the pins 116 extending laterally from the shaft 108.

The upper end 127 of the outer sleeve 120 (See FIG. 7) has a transverse slot 135 formed therein, having a base 136 formed in the walls thereof. The size of the slot 135 is tapered as shown at 137 to facilitate placement of the pins 116 as described below.

The slot 135 is formed at right angles to the longitudinal slots 126 in the outer sleeve 120. The top 127 of the sleeve 120, adjacent the ends of the slots 126 is inclined as shown at 133 towards the slots 126 to facilitate orientation of the pins 116 into the slots 126.

A coil spring 138 surrounds the central portion of the shaft 108 and at its upper end bears against the shoulder 124 of the outer sleeve 120. The lower end of the spring 138 rests against an annular retaining ring 140 below which there is inserted a retaining ring between a first and a second annular retaining ring 144 against which the upper end of the spring 148 is engaged.

The lower terminus 118 of the shaft 108 is located just below the upper portion of the spring 148. The lower end of the spring 148 is retained longitudinally in place by a retaining ring 150 secured in placed in annular slot 152 in the inner walls 121 of the sleeve 120. Below ring 150 is an annular drill guide 154 which is formed in close tolerance with the inner walls 121 of the outer sleeve 120 and has a central bore 155 through which the drill bit 102 passes. This guide 154 is retained through means of an annular retaining ring 156 which fits in annular grooves 158 on the inner wall 121 of the outer sleeve 120. The lower portion 157 of the outer sleeve 120 may have a hexagonal or other cross section which corresponds to the outer cross section of the upper portion of the bit 101 or be provided with lateral grooves to receive corresponding pins extending from the upper portion of the bit 101 to hold the bit into rotational engagement with the sleeve 120. The bit 101 is retained in the lower portion of the sleeve 120 by conventional magnetic means or by a snap arrangement 130 as shown. The bit 101 is, except for its central longitudinal passage 103, of the conventional Phillips-head type screwdriver design. It has a distal end 104, a proximal end 106, and wings having tapers 168.

Figure 7:
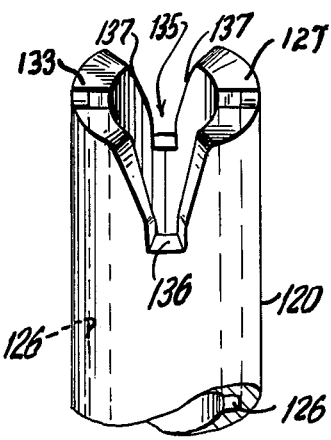
FIG. 7 is a perspective view of the upper portion of the outer shaft of the tool shown in the embodiment of FIG. 6.
Figure 8:
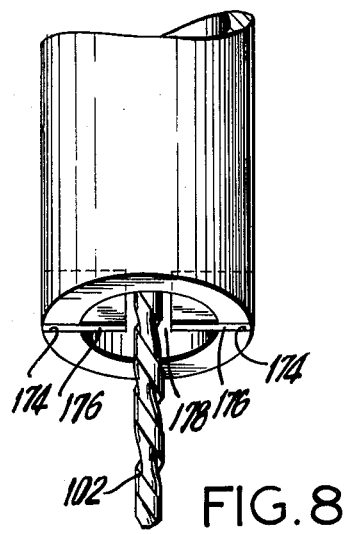
FIG. 8 is a perspective view of a portion of the lower part of the tool of FIG. 6 showing a further embodiment of the screwdriver bit.

FIG. 8 shows an alternate embodiment of the lower portion of the outer sleeve 120 for utilization with conventional types of screws. Here, the Phillips-head type screwdriver bit is not employed and the lower portion of the outer sleeve 120 is provided with transverse slots 174 into which are press-fitted steel plates 176 with a central gap 178 between them of sufficient distance to allow the passage of the bit 102. The lower surfaces of the plates 176 are then capable of engaging the screw when the bit 102 is retracted in the same manner as in the operation of the embodiment of FIGS. 6 and 7 which is described in more detail below.

The embodiment of the invention shown in FIG. 6 operates as follows: The outer hollow shaft 108 is fitted to the drill bit and locked in place by the set screw 112. In the state shown in FIG. 6, as one rotates the drill, the shaft 108 will likewise rotate, and as one presses down as the bit 102 bores into the material being drilled, the tension of the spring 148 is overcome and the shaft 108 slides downwardly within the sleeve 120 guided by the longitudinal slots 126 in combination with the pins 116, the bit 102 being held against lateral movement by the guide 154. When it is desired to stop drilling and utilize the screwdriver bit 101 to secure a Phillips-head type screw or other type of screw in place, the operator pulls downwardly on the outer sleeve 120 until the tension of the spring 138 is overcome and the pins 116 are pulled to the top 127 of the outer sleeve and the sleeve rotated 90° relative to the shaft 108. The outer sleeve is then released and the tension of the spring 138 forces the sleeve toward the upper end of the hollow shaft 108 locking the shaft 108 and the drill bit 102 in place against downward longitudinal movement relative to the outer sleeve 120 by engagement of the pins 116 with the base 136 of the slot 135 formed in the outer sleeve 120.

Figure 9:
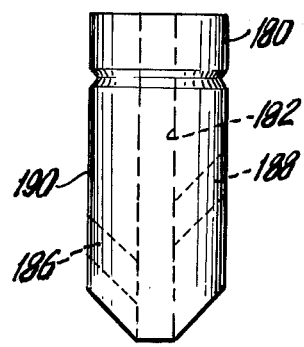
FIG. 9 is a side view showing an alternate drill bit for utilization with the embodiment of FIGS. 6 and 7.

In FIG. 9 is shown a screwdriver bit 180 for utilization with the embodiment of FIGS. 6 and 7. The bit 180 has a central bore 182 therethrough for passage of the drilling bit 102. The bit 180 is provided with upwardly inclined lateral passages 186 and 188 leading from the bore 182 to the sides 190 of the bit in order to provide for removal of the shavings generated by the action of the drill bit 102.

It is thus seen that the present invention provides an efficient, economical and relatively simple combination of screwdriver and drill which is particularly useful in precision cabinet work or sheet metal work. It is particularly helpful for workmen working on scaffolding and the like where it is inconvenient and inefficient to hook up a multitude of power tools. According to the present invention, one power tool may be used for a multitude of operations which previously required separate tools.

While the invention has been explained by a detailed description of certain specific embodiments, it is understood that various modifications and substitutions can be made in any of them within the scope of the appended claims which are intended also to include equivalents of such embodiments.

What is claimed is:

1. A combination screwdriver and drill tool comprising a hollow cylindrical outer sleeve having an upper end and a lower end, the internal walls of said outer sleeve having first longitudinal slots formed along a substantial length thereof and located diametrically opposed to each other, the internal diameter of said outer sleeve being less at the upper end thereof than that of the balance of said outer sleeve, a lateral downwardly facing shoulder formed at the point where said lesser and greater diameters of said outer sleeve join, a second slot formed in the outer walls of the upper end of said outer sleeve and extending completely therethrough and being oriented at a right angle to said first slots, a cylindrical shaft having a central passage therein and having a proximal end and a distal end located longitudinally within said outer sleeve, first spring means disposed on said shaft and engaging said downwardly facing shoulder to urge the distal end of said shaft extending to just below the central portion of said outer sleeve, a cutting drill bit extending through said central passage of said shaft and the length of said outer sleeve, said shaft and cutting drill bit being fixedly engaged with one another, second spring means urging said outer sleeve downwardly with respect to said cutting drill bit and shaft, transverse pin means extending from said shaft, engaging said first longitudinal slots in said outer sleeve, the base of said slots serving as a stop means engageable with said pins to limit downward movement of said shaft and cutting drill bit with respect to said outer sleeve, guide means in the lower portion of said outer sleeve for said cutting drill bit, and changeable screwdriver bit means secured in the lower portion of said outer sleeve and locked against rotation relative to said outer sleeve, and a longitudinal central passage within said changeable screwdriver bit means adaptable to permit said cutting drill bit to pass therethrough.

2. A tool as claimed in claim 1 wherein lateral passages extend from a central bore in said screwdriver bit means to the external surfaces of said changeable screwdriver bit are provided in order to remove having generated by the action of said cutting drill bit.

* * * * *